(12) United States Patent
Oh (10) Patent No.: US 11,461,214 B2
(45) Date of Patent: Oct. 4, 2022

(54) DEVICE FOR PROVIDING VISITOR BEHAVIOR ANALYSIS DATA OF DYNAMIC WEBPAGE, AND METHOD FOR PROVIDING VISITOR BEHAVIOR ANALYSIS DATA OF WEB SHE USING SAME

(71) Applicant: 4GRIT INC., Seongnam-si (KR)

(72) Inventor: Hyeong Ook Oh, Gwangju-si (KR)

(73) Assignee: 4GRIT INC., Seongnam-si (KR)

( * ) Notice: Subject to any disclaimer, the term of this patent is extended or adjusted under 35 U.S.C. 154(b) by 0 days.

(21) Appl. No.: 16/772,738

(22) PCT Filed: Dec. 13, 2018

(86) PCT No.: PCT/KR2018/015813
§ 371 (c)(1),
(2) Date: Jun. 12, 2020

(87) PCT Pub. No.: WO2019/117637
PCT Pub. Date: Jun. 20, 2019

(65) Prior Publication Data
US 2020/0327031 A1      Oct. 15, 2020

(30) Foreign Application Priority Data
Dec. 13, 2017   (KR) .......................... 10-2017-0171369

(51) Int. Cl.
*G06F 11/34* (2006.01)
*G06F 16/958* (2019.01)
*H04L 67/025* (2022.01)

(52) U.S. Cl.
CPC ........ *G06F 11/3438* (2013.01); *G06F 16/972* (2019.01); *H04L 67/025* (2013.01); *G06F 2201/88* (2013.01)

(58) Field of Classification Search
CPC .............. G06F 11/3438; G06F 16/972; G06F 2201/88; H04L 67/025
See application file for complete search history.

(56) References Cited

U.S. PATENT DOCUMENTS

| 10,474,735 | B2* | 11/2019 | DeLoach | .............. G06F 40/106 |
| 2012/0010995 | A1* | 1/2012 | Skirpa | ..................... G06F 16/95 |
| | | | | 705/14.49 |
| 2012/0296746 | A1* | 11/2012 | Bleadall | ................ G06F 16/332 |
| | | | | 705/14.66 |

FOREIGN PATENT DOCUMENTS

| JP | 2012-519918 A | 8/2012 |
| KR | 10-2006-0075696 A | 7/2006 |
| KR | 10-2014-0028155 A | 3/2014 |
| KR | 10-1381921 B1 | 4/2014 |

(Continued)

*Primary Examiner* — Azizul Choudhury
(74) *Attorney, Agent, or Firm* — Novick, Kim & Lee, PLLC; Sang Ho Lee; Hyun Woo Shin (57) ABSTRACT

A method for providing analysis data of a dynamic website is a method for providing analysis data, the method including the steps of: receiving visitor behavior analysis data of a dynamic webpage; identifying, from the dynamic webpage, an effective area corresponding to an effective element; acquiring, from the analysis data, event counter data corresponding to the effective area; on the basis of the event counter data, generating a heatmap representing analysis results of user behavior on the dynamic webpage; and synchronizing the generated heatmap onto the dynamic webpage, and outputting same.

17 Claims, 10 Drawing Sheets

(56) References Cited

FOREIGN PATENT DOCUMENTS

KR  10-2015-0116317 A  10/2015
KR  10-1790790 B1  10/2017

* cited by examiner

DEVICE FOR PROVIDING VISITOR BEHAVIOR ANALYSIS DATA OF DYNAMIC WEBPAGE, AND METHOD FOR PROVIDING VISITOR BEHAVIOR ANALYSIS DATA OF WEB SHE USING SAME

TECHNICAL FIELD

The present invention relates to an analysis device and a method thereof. More specifically, the present invention relates to a device for providing visitor behavior analysis information of a dynamic webpage, and a method of providing visitor behavior analysis information of a website using the same.

BACKGROUND ART

As the importance of online environments is emerged with the development of Internet technologies, the demand for web platform contents is increasing. In accordance with this, web service contents based on various web platforms are provided very widely.

As the demand for these web platform-based contents increases, the demand for an analysis service for generating additional profits according to increase in the rate of visiting a website and increase in the effect of advertisement by collecting and analyzing data on the contents also increases.

Accordingly, efficient database construction for a website that serves as a basis for analysis service and visualization technology elements for directly and visually displaying an analysis result are proposed.

It is general that the visualization technology elements of the current web analysis service previously store the tendency of user's activity, clicking rates and the like for a predetermined period of time, and provide a result of the analysis conducted for a predetermined period of time through a separate analysis page or the like, or display the result on a simulated webpage or a captured webpage.

However, recently, most of websites do not provide static webpages of a structure simply loading files stored in advance, but are tend to be configured of dynamic webpages that interpret user's requests and dynamically provide data processed by a script, and existing general techniques are not used to efficiently analyze and visualize the results of analyzing the dynamic webpages.

For example, since it needs to periodically capture images and collect and match element information when a visualized analysis result is provided on a screen on which a webpage has been captured, there is a problem of generating an unnecessary data storage and an additional computation amount. Particularly, when the page response speed is low, a problem of incorrect image capture also occurs.

In addition, in the case of image capture, since an analysis result is provided using only limited images with a specific capture means in a recent web environment in which the webpage output means is diversified, there is a problem in that a capture screen different from a screen of a user actually receiving an analysis service can be provided. In addition, in the case of the capture screen, it is difficult to match an animation screen element of a dynamic webpage with user activity information corresponding thereto.

To solve this problem, a technique of analyzing and processing a webpage, generating an analysis information visualization page capable of dynamic simulation, and providing the analysis information visualization page as an analysis page to a user is also provided as an example.

However, since a simulation analysis page or a separately processed HTML source code is not the same as an actually used webpage, access of external servers to referenced contents (e.g., images, style sheets, scripts, etc.) is blocked in some cases, and accordingly, there is a problem in that a webpage to be analyzed is not be properly displayed.

In addition, when a dynamic webpage is analyzed, reprocessed and simulated, elements implemented as a script are very likely to be abnormally displayed. In particular, there is a problem in that element data that is dynamically changed by a scroll or an event, user's clicking activities and the like are not matched and visualized in real-time, and may not be normally displayed to the user.

Therefore, in the case of a current dynamic webpage that changes very quickly and diversely in real-time, analysis of user's activity is not performed correctly, and resource efficiency is also lowered, and particularly, users suffer from inconvenience due to the configuration of an analysis page that is not intuitive.

DISCLOSURE OF INVENTION

Technical Problem

Therefore, the present invention has been made in view of the above problems, and it is an object of the present invention to provide a device for providing visitor behavior analysis information of a dynamic webpage, and a method of providing visitor behavior analysis information of a website using the same, which can provide visualized user behavior analysis information in real-time by using a dynamic webpage of a website actually accessed by a visitor as it is so that an analysis result may be visualized and intuitively provided without additional capture resources or reprocessing.

Technical Solution

To accomplish the above object, according to one aspect of the present invention, there is provided a method of providing dynamic website analysis information, the method comprising the steps of: receiving visitor behavior analysis data of a dynamic webpage; identifying an effective area corresponding to an effective element from the dynamic webpage; acquiring event counter information corresponding to the effective area from the analysis data; generating a heat map showing a user behavior analysis result on the dynamic webpage on the basis of the event counter information; and synchronizing and outputting the generated heat map on the dynamic webpage.

According to another aspect of the present invention, there is provided a device for providing dynamic website analysis information, the device comprising: a communication unit for receiving visitor behavior analysis data of a dynamic webpage; an effective area identification unit for identifying an effective area corresponding to an effective element from the dynamic webpage; an event count identification unit for acquiring event counter information corresponding to the effective area from the analysis data; a heat map generation unit for generating a heat map showing a user behavior analysis result on the dynamic webpage on the basis of the event counter information; and a dynamic webpage synchronization unit for synchronizing and outputting the generated heat map on the dynamic webpage.

The method of providing dynamic website analysis information according to an embodiment of the present invention, which is provided to solve the problems described above, may be implemented as a recording medium in which a program for executing the method in a computer is recorded.

Advantageous Effects

According to an embodiment of the present invention, intuitive user behavior analysis information can be provided in real-time by outputting visualized user behavior analysis information in synchronization with a dynamic webpage using the dynamic webpage provided with a modularized service providing module.

Accordingly, the present invention may provide a device for providing visitor behavior analysis information of a dynamic webpage, and a method of providing visitor behavior analysis information of a website using the same, which can provide visualized user behavior analysis information in real-time by using a dynamic webpage of a website actually accessed by a visitor as it is so that an analysis result may be visualized and intuitively provided without additional capture resources or reprocessing.

MODES FOR CARRYING OUT THE INVENTION

Hereinafter, only the principle of the present invention will be described. Therefore, those skilled in the art may implement the principle of the present invention that is not clearly described or shown in this specification and invent various apparatuses included within the concept and scope of the present invention. In addition, it should be understood that, in principle, all the conditional terms and embodiments arranged in this specification should be clearly intended only for the purpose understanding the concept of the present invention and are not restrictive to the embodiments and states specially arranged like this.

In addition, it should be understood that all the detailed descriptions arranging specific embodiments, as well as the principle, viewpoint and embodiments of the present invention, are intended to include structural and functional equivalents thereof. In addition, it should be understood that these equivalents include the equivalents that will be developed in the future, as well as the equivalents open to the public presently, i.e., all components invented to perform the same function regardless of the structure.

Accordingly, for example, block diagrams of the present invention should be understood as showing a conceptual viewpoint of an exemplary circuit which specifies the principle of the present invention. Similarly, all flowcharts, state transition diagrams, pseudo codes and the like should be understood as being practically stored in a computer-readable medium and showing various processes performed by a computer or a processor regardless of whether the computer or the processor is clearly shown in the figure.

The functions of various components shown in the figures including a processor or a function block that is displayed as a concept similar thereto may be provided using hardware capable of executing software in relation to proper software, as well as dedicated hardware. When being provided by the processor, the functions may be provided by a single dedicated processor, a single shared processor or a plurality of individual processors, and some of these may be shared.

In addition, clear use of a term presented as a processor, a controller or a concept similar thereto should not be interpreted by exclusively quoting hardware capable of executing software and should be understood to implicitly include digital signal processor (DSP) hardware and ROM, RAM and non-volatile memory for storing the software without limit. It may include already-known other hardware.

In the claims of this specification, the constitutional components expressed as a means for performing a function disclosed in the detailed description are intended to include, for example, all methods performing the functions including all forms of software including a combination of circuit elements or firmware/microcode or the like performing the functions, and combined with appropriate circuits for executing the software to perform the functions. Since the present invention defined by the claims combines the functions provided by diversely arranged means and is combined with the methods requested by the claims, it should be understood that any means which can provide the functions is equivalent to those grasped from this specification.

The objects, features and advantages described above will be further clear through the following detailed descriptions related to the accompanying drawings, and therefore, those skilled in the art may easily embody the spirit of the present invention. In addition, in describing the present invention, when it is determined that the detailed description of known techniques related to the present invention may unnecessarily blur the gist of the present invention, the detailed description will be omitted.

Hereinafter, preferred embodiments according to the present invention will be described in detail with reference to the accompanying drawings.

Figure 1:
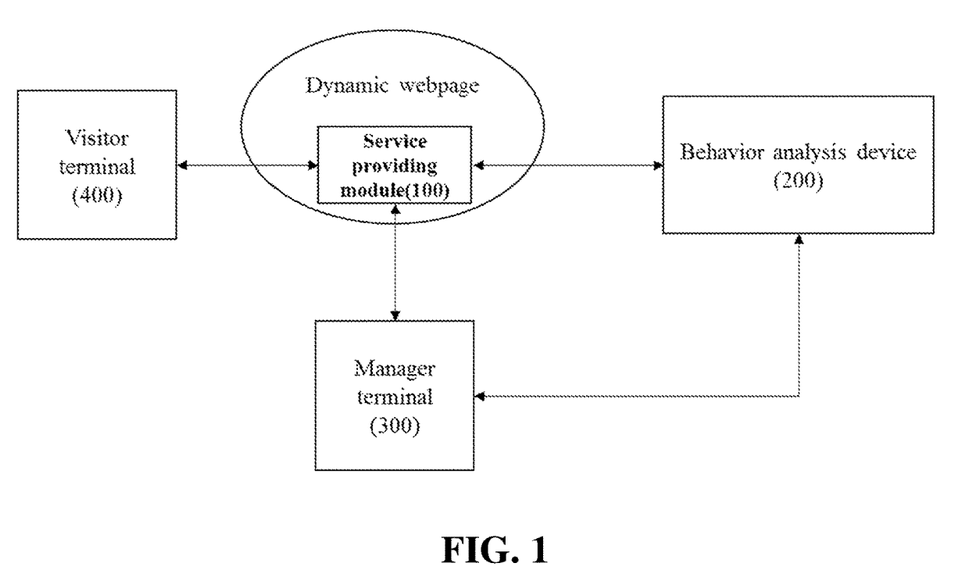
FIG. 1 is a block diagram showing the entire system according to an embodiment of the present invention.

FIG. 1 is a block diagram showing the entire system according to an embodiment of the present invention.

Referring to FIG. 1, the entire system according to an embodiment of the present invention includes a service providing module 100 provided in the form of a module of a dynamic webpage which provides contents, a behavior analysis device 200 communicatively connected to the service providing module 100, and a manager terminal 300 or a visitor terminal 400 interacting with the dynamic webpage including the service providing module 100.

First, a website which provides the dynamic webpage may provide online contents through various platforms. The website may be, for example, a general online shopping mall, an Internet portal site, a personal blog site, a news site, a community site, or the like.

The service providing module 100 may be provided by a website server, which provides a dynamic webpage to the manager terminal 300 or the visitor terminal 400, to perform an operation function. Accordingly, the service providing module 100 may be executed on a process of the manager terminal 300 or the visitor terminal 400 to be implemented, and may be connected to the behavior analysis device 200 through a network.

Here, the configuration and function operations described focusing on the service providing module 100 in the embodiment of the present invention may be implemented as the configuration and function operations of the manager terminal 300 or the visitor terminal 400. Accordingly, the device and method for providing behavior analysis information according to an embodiment of the present invention may be implemented as the service providing module 100 included in the dynamic webpage functions in the manager terminal 300 or the visitor terminal 400.

For example, the service providing module 100 may be implemented as a modularized script inside the dynamic webpage for collecting and providing user behavior analysis information from element information of the dynamic webpage, and may perform a behavior analysis information providing process according to an embodiment of the present invention on the basis of web browser access information of the manager terminal 300 or the visitor terminal 400.

In addition, the service providing module 100 may be implemented as an independent device, or may be implemented as an information providing device configured as a server to output calculated information to the manager terminal 300 and the visitor terminal 400.

In addition, a network to which the behavior analysis device 200 and the service providing module 100 functioning in the manager terminal 300 or the visitor terminal 400 are connected may be implemented as all kinds of wired/wireless networks such as a local area network (LAN), a wide area network (WAN), a value added network (VAN), a personal area network (PAN), a mobile radiocommunication network, a satellite communication network, and the like.

In addition, the service providing module 100 may be executed when a dynamic webpage including the service providing module 100 is loaded, and acquires information for accessing an identified dynamic webpage from the manager terminal 300 or the visitor terminal 400 and determines a visitor entering a data collection mode or a manager mode corresponding to the access information.

In addition, according to the determined mode, the service providing module 100 transmits event data collected and analyzed in real-time from the visitor terminal 400 to the behavior analysis device 200, in the data collection mode, i.e., a first mode, so that the analysis information may be processed, and receives an analysis data corresponding to the dynamic webpage, and transmits a visualized dynamic webpage corresponding to the analysis data to the manager terminal 300, in the manager mode, i.e., a second mode, so that the dynamic webpage visualizing the analysis data may be provided.

Accordingly, real-time analysis corresponding to a dynamic webpage and provision of analysis information can be accomplished through the service providing module 100 corresponding to the corresponding webpage, without separately processing a capture image or a code for simulation.

In addition, the service providing module 100 may provide a dynamic webpage, in which the analysis information is visualized, in synchronization with driving of the dynamic webpage. This particularly may provide a user behavior analysis result synchronized with a user input in a dynamic webpage, such as a reactive webpage or a Parallax Scrolling page that generates a parallax between background images and object images to scroll, and a manager may grasp an analysis result more intuitively and clearly.

In addition, as the service providing module 100 may be provided in the form of add-on added to an existing dynamic webpage to operate, it is easy to install the module and configure a system thereof.

Figure 2:
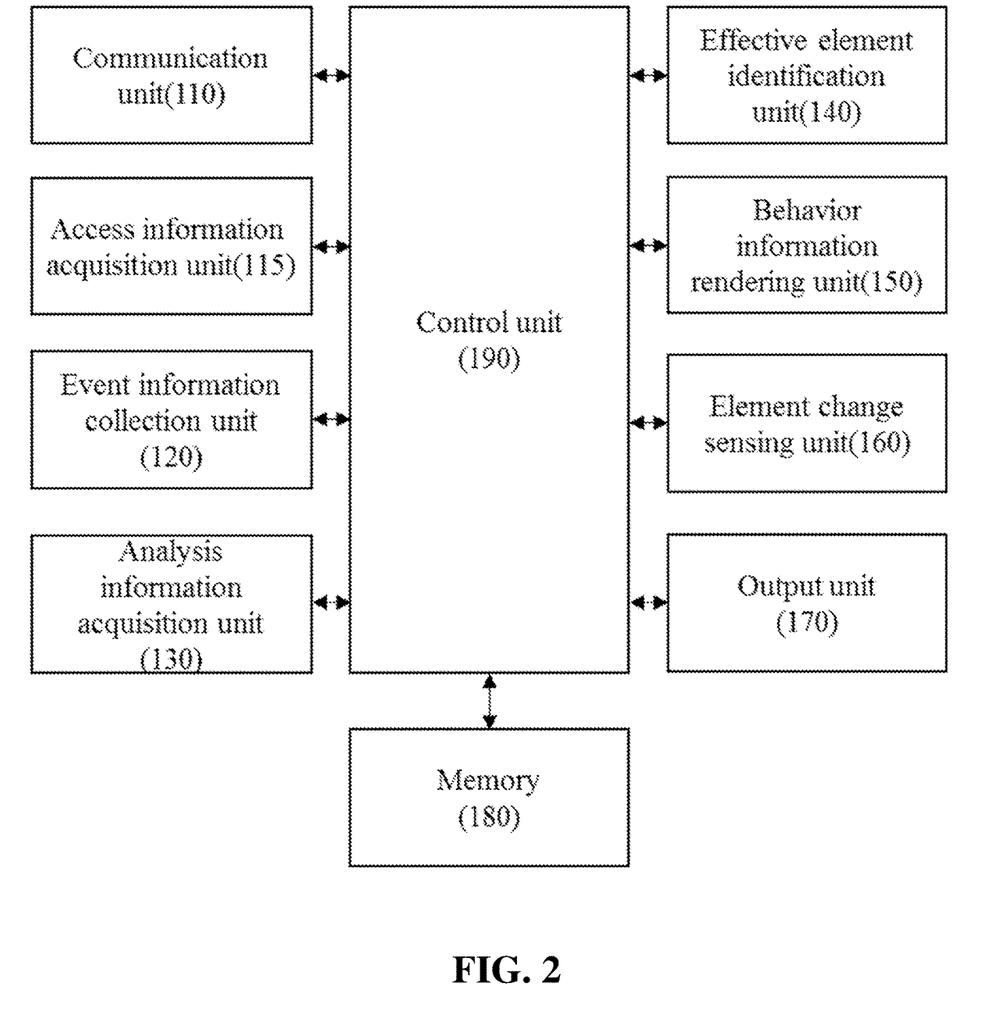
FIG. 2 is a block diagram showing a behavior analysis information providing device including a service providing module according to an embodiment of the present invention in more detail.

FIG. 2 is a block diagram showing a behavior analysis information providing device including a service providing module according to an embodiment of the present invention in more detail.

Referring to FIG. 2, a behavior analysis information providing device according to an embodiment of the present invention may be various information providing devices in which a dynamic webpage including the service providing module 100 is driven, and includes a control unit 190, a communication unit 110, an event information collection unit 120, an analysis information acquisition unit 130, an effective element identification unit 140, a behavior information rendering unit 150, an element change sensing unit 160, an output unit 170, and a memory 180 for driving of the dynamic webpage.

The control unit 190 generally controls execution of the operation and function of each component of a device including the service providing module 100. For example, the control unit 110 may be implemented as a processor for controlling all or some of the functions of acquiring access information, collecting event information, acquiring analysis information, identifying effective elements, rendering behavior information, and sensing and outputting changes in the element, or as a program for executing the same.

In addition, the communication unit 110 may include one or more communication modules which enables wired/wireless communication between a device including the service providing module 100 and a wired/wireless communication system including a mobile communication network or an Internet network or between the networks.

An access information acquisition unit 115 acquires information for accessing a website which provides a dynamic webpage, and provides the acquired access information to the control unit 190. Here, the access information includes access information for accessing a website on the network, and it can be, for example, a URL of a specific webpage.

Then, the control unit 190 determines an operation mode on the basis of the acquired access information. Here, the operation mode may be any one among a data collection mode as a first mode for collecting and transmitting event information for analyzing visitor's behavior information, and a manager mode as a second mode for receiving analysis data according to the analyzed behavior information and providing a visually rendered dynamic webpage.

For example, although the access information is access information of the same dynamic webpage, unlike the URL of the dynamic webpage in the first mode, key information may be added to the dynamic webpage in the second mode, and the control unit 190 may determine entering the first mode or the second mode using existence of the key information.

First, in the case of entering the first mode, the control unit 190 may output a general dynamic webpage through the output unit 170.

In addition, in the first mode, the event information collection unit 120 may collect user event information from a user input of the dynamic webpage, and transmit the collected event information to the behavior analysis device 200. The event information may be transmitted together with user information, and the user information may include, for example, device information or user identification information.

Figure 3:
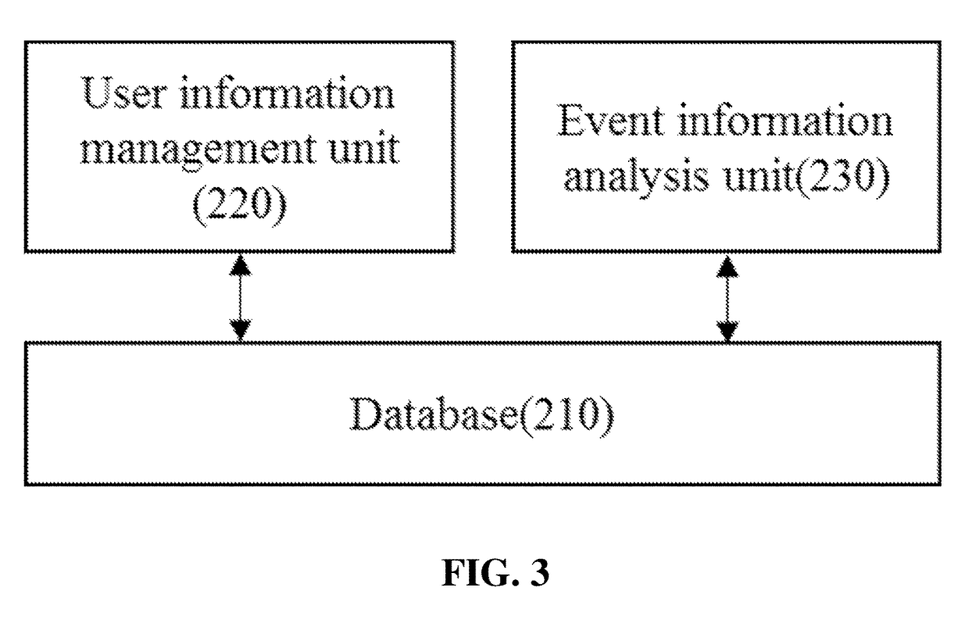
FIG. 3 is a block diagram showing a behavior analysis device according to an embodiment of the present invention.

Here, referring to FIG. 3, FIG. 3 is a block diagram showing a behavior analysis device according to an embodiment of the present invention, and the behavior analysis device 200 may be implemented in the form of a server located in an external network, and may include a user information management unit 220, an event information analysis unit 230, and a database unit 210.

The user information management unit 220 registers and manages user information for providing service in the database 210, and performs a confirmation process corresponding to the user information received from the service providing module 100.

Here, the user information may be divided into general user information and manager information, and when the manager information is received from the service providing module 100, the user information management unit 220 may further perform registration and confirmation of authority information corresponding to the manager information.

In addition, the event information analysis unit 230 may analyze the event information received from the event information collection unit 120 of the service providing module 100, and store the analysis result in the database 210 after matching the analysis result to the synchronized webpage information described above. Thereafter, the analyzed event information may be provided to the service providing module 100 in response to a request of the service providing module 100.

Here, referring to FIG. 2 again, in the case of the service providing module 100 that has entered the second mode, the analyzed event information may be requested from the behavior analysis device 200 through the analysis information acquisition unit 130, and the service providing module 100 may receive analysis data analyzed in advance from the behavior analysis device 200 in correspondence to the dynamic webpage.

Accordingly, the effective element identification unit 140 may identify an effective element corresponding to the current dynamic webpage from the analysis data. Here, the effective element may include one or more functional elements on a webpage capable of generating a dynamic event according to a user input. For example, the effective element may include one or more webpage elements in which a function according to clicking, scrolling or hovering is performed on the dynamic webpage. In addition, according to the operation on the dynamic webpage, an element processed to be hidden or obscured on the surface by overlapping of another layer may be excluded from the effective element.

Accordingly, the effective element identification unit 140 visualizes analysis data on the dynamic webpage to selectively determine an effective area to be provided.

Then, the behavior information rendering unit 150 identifies analysis data to be outputted in correspondence to the selected effective area, and renders a visualized behavior map using the identified analysis data, and the control unit 190 outputs a dynamic webpage mapped to the behavior map through the output unit 170. For example, the behavior map may be configured in the form of a heat map showing the frequency of mouse click and hovering of the user, and the control unit 190 may dynamically provide a heat map synchronized with the dynamic webpage according to a user input of the dynamic webpage.

In addition, the element change sensing unit 160 senses changes in the element according to a user input of the manager terminal 300 in the second mode, and when an element change is generated, the element change sensing unit 160 provides information on the element change to the behavior information rendering unit 150 to perform an update process on a behavior map corresponding to the element change. Accordingly, when an element change of a dynamic webpage occurs while confirming the visualized behavior map on the manager terminal 300, the update process of the behavior map may be performed by tracking the element change in real-time.

Accordingly, the user behavior analysis result of the effective elements may be provided together with the actual operation of the dynamic webpage as it is, and since the analysis result may be provided without being synchronized with the server, the analysis result may be provided together with a fast and natural dynamic webpage operation.

Figure 4:
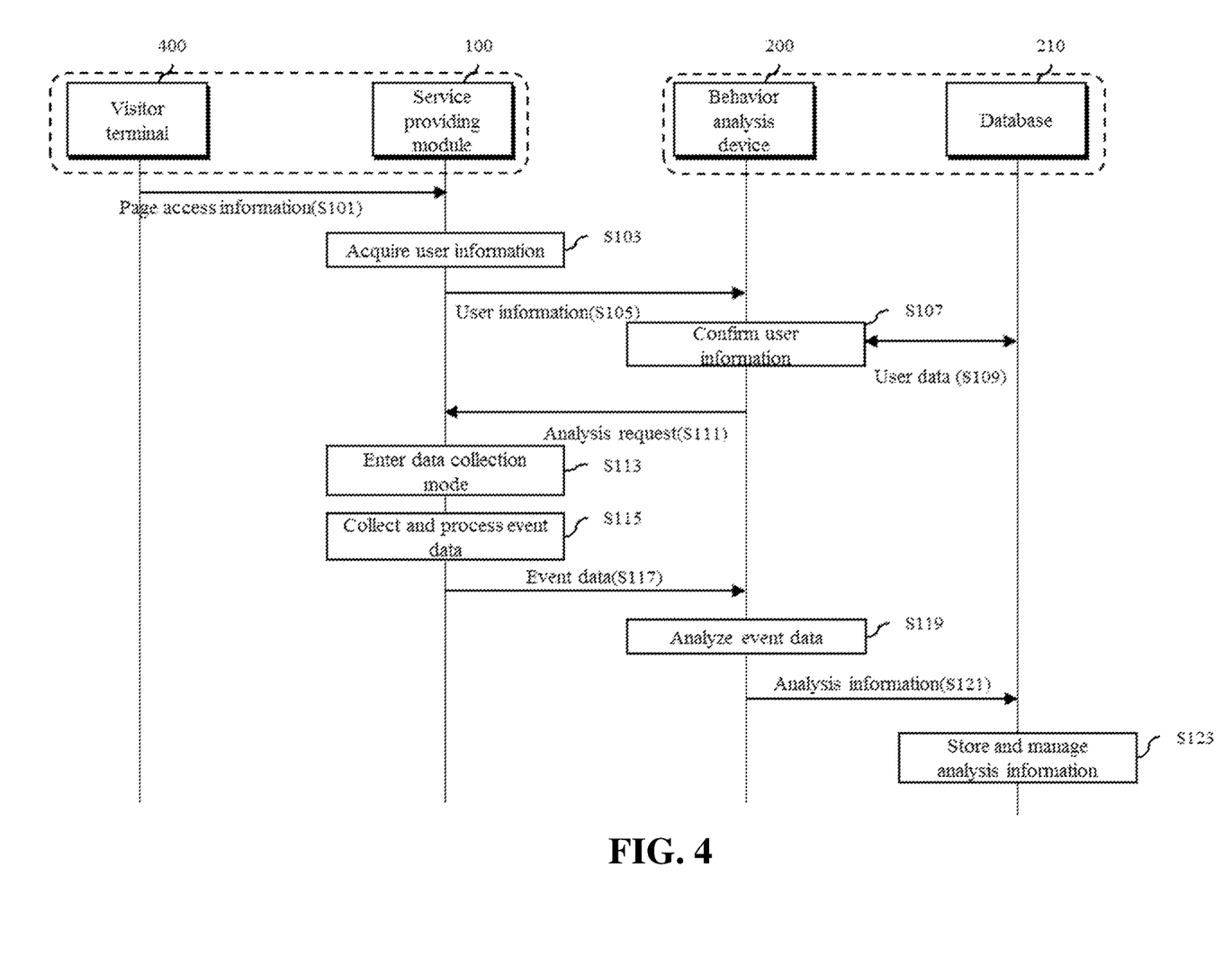
FIGS. 4 and 5 are a sequence diagram and an exemplary view illustrating a visitor access operation of a behavior analysis information providing method according to an embodiment of the present invention.
Figure 5:
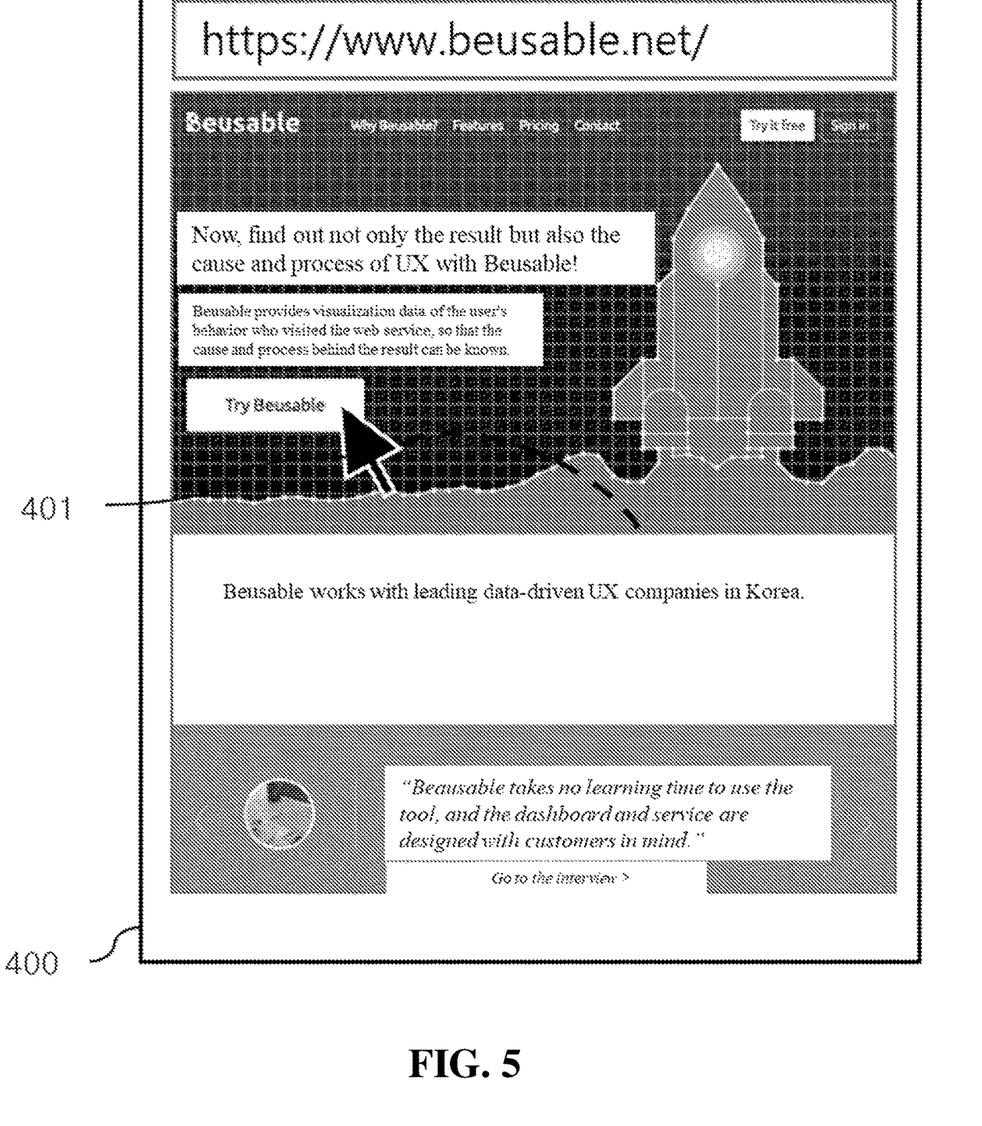

FIGS. 4 and 5 are a sequence diagram and an exemplary view illustrating a visitor access operation of a behavior analysis information providing method according to an embodiment of the present invention.

Referring to FIG. 4, page access information is inputted from the visitor terminal 400 (S101), and the service providing module 100 according to an embodiment of the present invention acquires user information from the page access information (S103).

Here, the user information is provided to the behavior analysis device 200, and the behavior analysis device 200 confirms the user information through the database 210 (S107, S109), and transfers an analysis request to the service providing module 100 (S111) when the user information is confirmed.

Accordingly, the service providing module 100 may enter the data collection mode (S113). Then, in the data collection mode, the service providing module 100 may collect and process event data (S115), and transfer the event data to the behavior analysis device 200 (S117).

Here, referring to FIG. 5, the event information may include at least one among event type information, event specific information, and event location information. For example, the event information may be determined by the operation of the mouse pointer 401 as shown in FIG. 5.

Accordingly, the event type information may be any one among clicking, moving, and scrolling, and the event specific information may include element information of a webpage corresponding to an element in which an event has occurred according to the event type. For example, the event specific information may be shown, for example, in the form of webpage element information like HEADER # header>DIV:nth-child(2)>DIV:nth-child(1)>DIV:nth-child(2)>UL:nth-child(1)>LI:nth-child(4)>UL:nth-child(2).
Meanwhile, the event location information is the location where the event has occurred and may be shown, for example, in the form of (x:15, y:20).

Meanwhile, the behavior analysis device 200 may analyze the received event data (S119), and store and manage analysis information according to the analysis in the database 210 (S121, S123).

Here, analysis of event data may be performed according to an event counter corresponding to an event element. For example, according to data collection, event type information corresponding to each event element information and a counter value corresponding thereto may be acquired, and the acquired information may be classified and stored in the database 210 in correspondence to the dynamic webpage.

Figure 6:
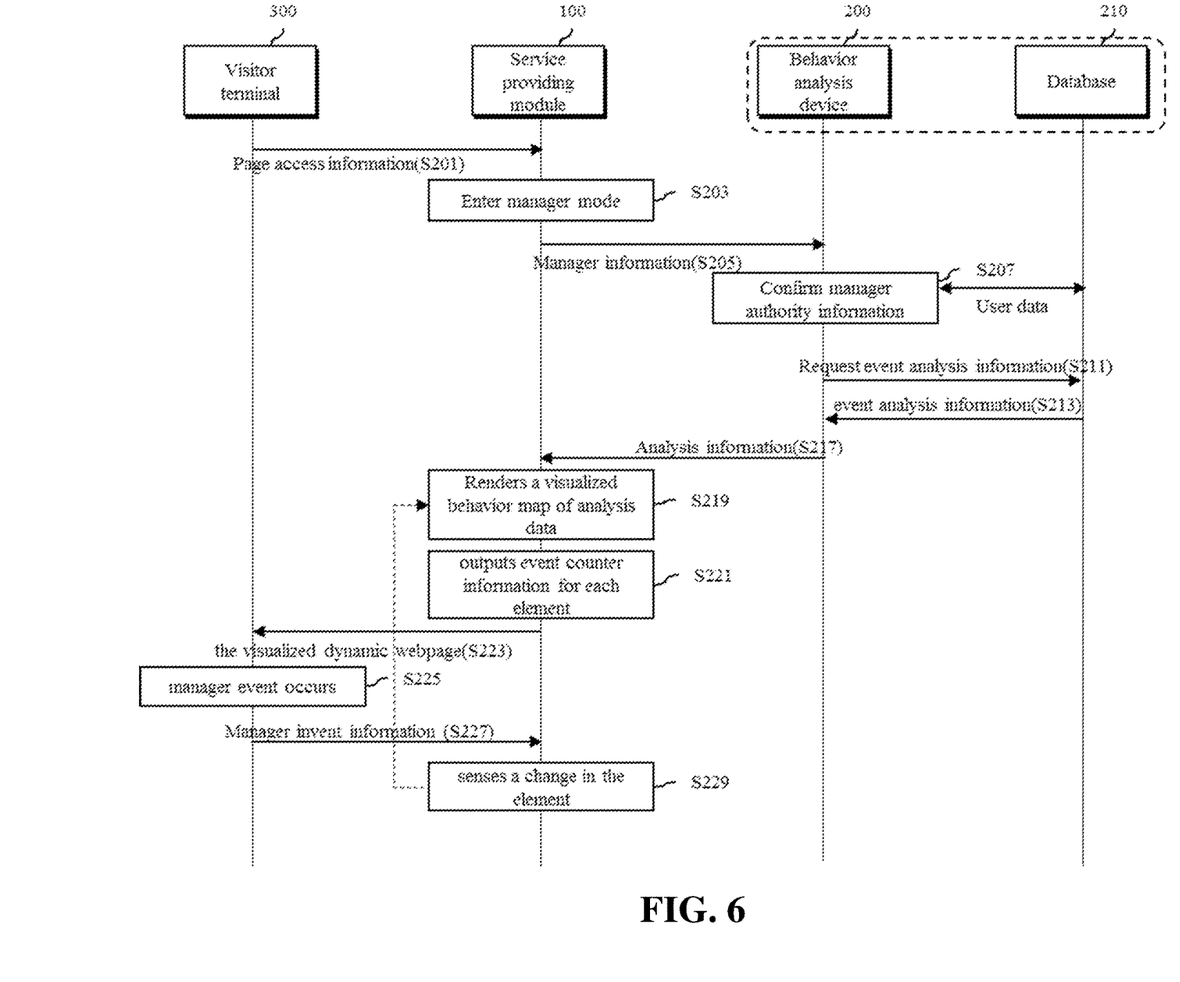
FIGS. 6 to 8 are a sequence diagram and exemplary views illustrating a manager access operation of a behavior analysis information providing method according to an embodiment of the present invention.
Figure 7:
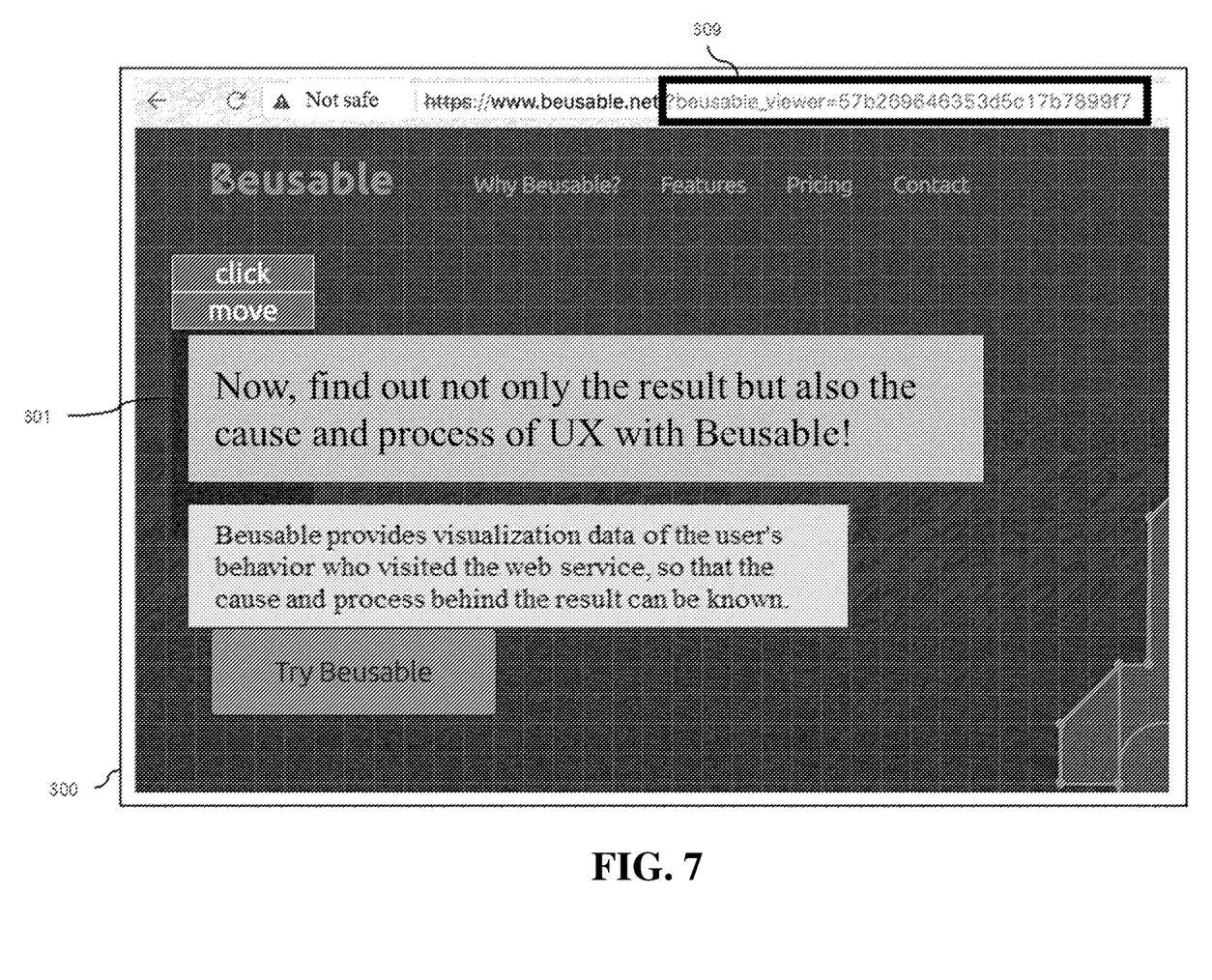
Figure 8:
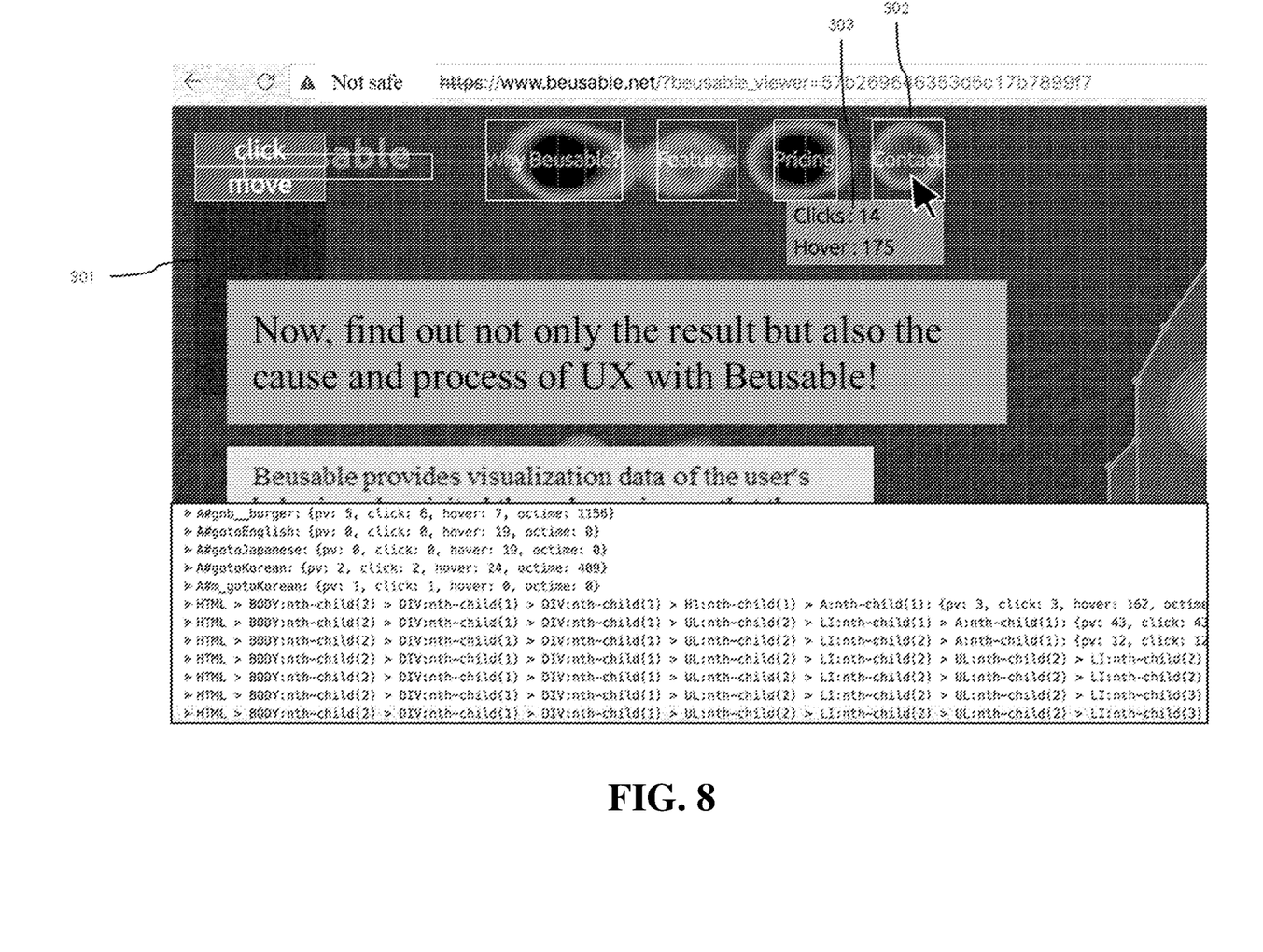

Meanwhile, FIGS. 6 to 8 are a sequence diagram and exemplary views illustrating a manager access operation of a behavior analysis information providing method according to an embodiment of the present invention.

Referring to FIG. 6, the service providing module 100 according to an embodiment of the present invention identifies entering the manager mode (S203) from the page access information inputted from the manager terminal 300 (S201), acquires manager information corresponding to entering the manager mode, and provides the manager information to the behavior analysis device 200 (S205).

As shown in FIG. 7, when the manager access is processed, access information of a form adding manager key information 309 to normal access information may be configured. Accordingly, the service providing module 100 may acquire the manager key information from the access information, and provide the manager key information to the behavior analysis device 200.

Then, the behavior analysis device 200 confirms the manager information and the authority information stored in the database 210 through the user information management unit 220 (S207), and requests and acquires previously stored event analysis information when the confirmation is completed (S211, S213), and transmits the acquired analysis data to the service providing module 100 (S217).

In addition, as entering the manager mode, the service providing module 100 may output a menu interface 301 provided on the dynamic webpage and a behavior map analysis result according to an input of the menu interface 301 through the manager terminal 300 as shown in FIGS. 7 and 8.

To this end, the service providing module 100 renders, through the behavior information rendering unit 150, a visualized behavior map from the received analysis data and outputs the visualized behavior map on the dynamic webpage (S219), and outputs event counter information for each element corresponding to an interface input (S221). Accordingly, the visualized dynamic webpage may be outputted through the manager terminal 300 (S223).

For example, the service providing module 100 may check whether all the elements of the currently accessed dynamic webpage are effective through the effective element identification unit 140, and identify effective elements according to a result of the check.

Then, the service providing module 100 may render the analysis data received from the behavior analysis device 200 as a behavior map centered on one or more effective elements currently existing in the dynamic webpage through the behavior information rendering unit 150. The rendered behavior map may be outputted to be overlaid on the dynamic webpage.

In addition, the service providing module 100 may display counter information based on each effective element according to the interface input described above through the behavior information rendering unit 150. For example, the counter information may be any one among a click (CLICK) event count and a hovering (HOVER) event count, and may be intuitively displayed (303) around the effective element 302 according to a manager input, and detailed counter information may be additionally outputted together as shown on the bottom of FIG. 8.

For example, the behavior information rendering unit 150 may render an event index of the analysis data received from the analysis device 200 as a heat map reprocessed on the basis of the effective element existing in the current page. In addition, the behavior information rendering unit 150 may render by generating an index for each event. For example, the behavior information rendering unit 150 may generate one or more elements at the same location as that of each element, and output one or more indexes for each mouse event of each element, such as clicking or hovering.

On the other hand, when a manager event such as a click or the like occurs from the manager terminal 300 (S225), the service providing module 100 acquires manager event information from the manager terminal 300 (S227), and senses a change in the element corresponding to the event information (S229).

Then, when the element change is sensed, the service providing module 100 performs again steps S219 to S223 described above so that the change in the behavior map of a form synchronized with the element change of the dynamic page may be processed. Accordingly, when the position of an element of a page is changed or a new element is generated due to a mouse scroll or a mouse event of the manager, the service providing module 100 may render a behavior map based on the effective element of the current page screen, and output event count information corresponding thereto.

Figure 9:
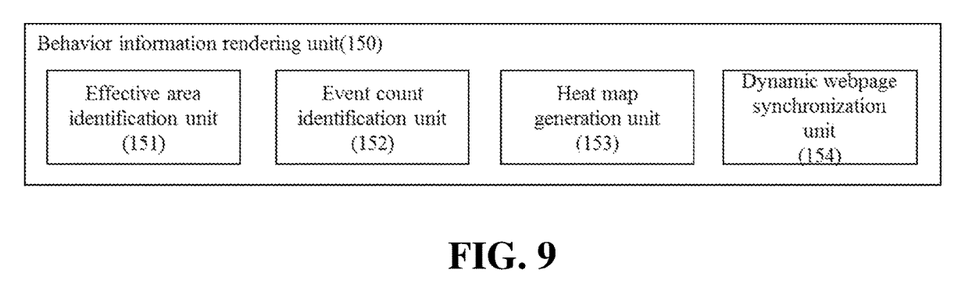
FIGS. 9 to 11 are views for explaining, in more detail, a behavior information rendering unit and a user interface providing method using the same according to an embodiment of the present invention.
Figure 10:
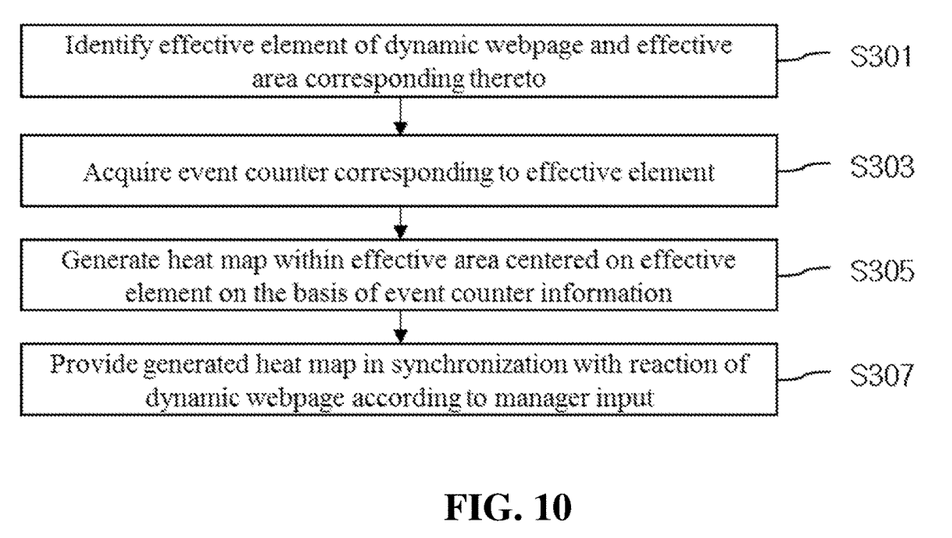
Figure 11:
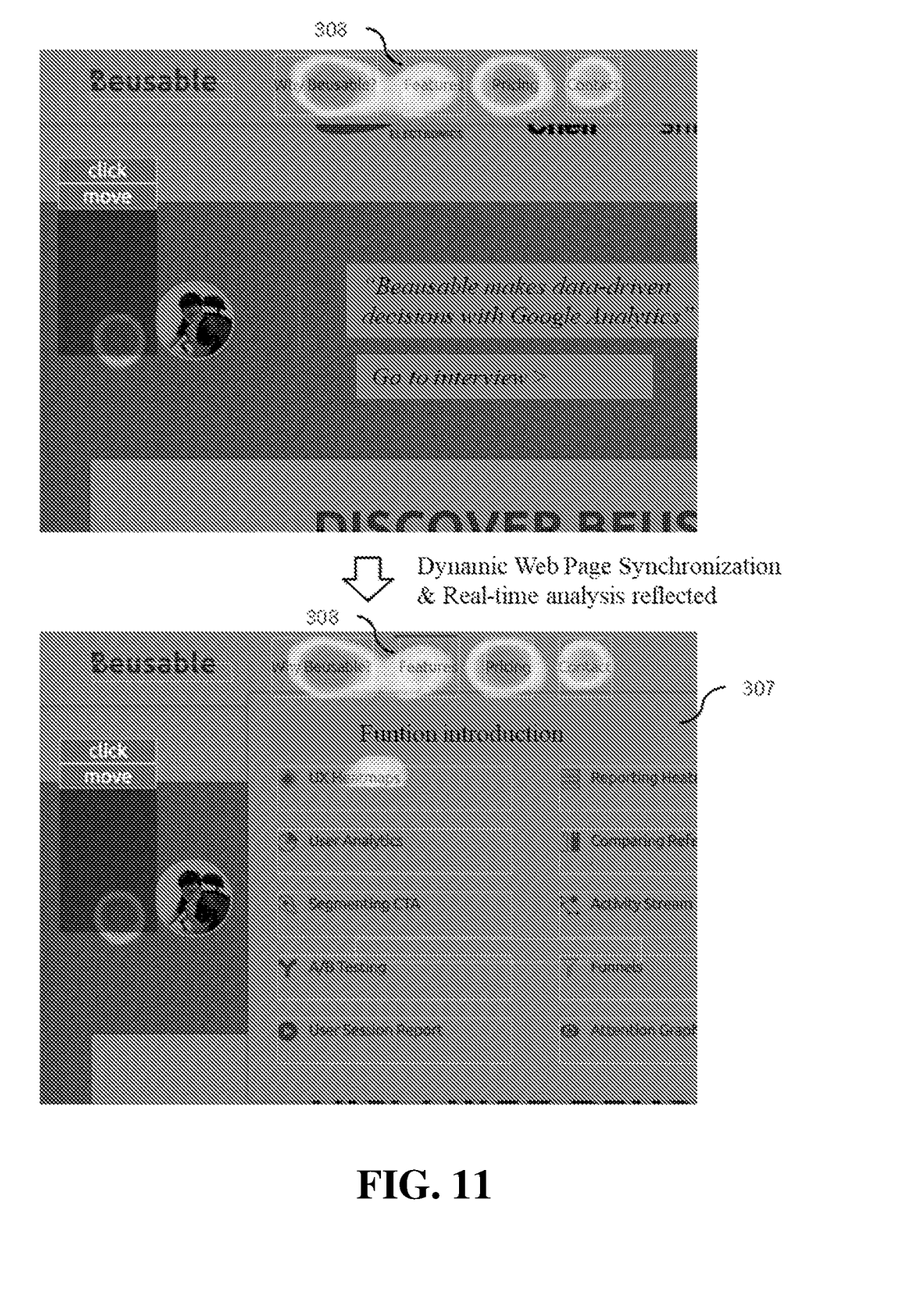

FIGS. 9 to 11 are views for explaining, in more detail, a behavior information rendering unit and a user interface providing method using the same according to an embodiment of the present invention.

FIG. 9 is a block diagram showing the behavior information rendering unit 150 according to an embodiment of the present invention in more detail.

Referring to FIG. 9, the behavior information rendering unit 150 according to an embodiment of the present invention includes an effective area identification unit 151, an event count identification unit 152, a heat map generation unit 153, and a dynamic webpage synchronization unit 154.

When an effective element of the current webpage is identified by the effective element identification unit 140, the effective area identification unit 151 determines an effective area on a webpage in which behavior information centered on the effective element is rendered, and transfers information on an area corresponding the effective area to the heat map generation unit 153.

Then, the event count identification unit 152 identifies event count information from the analysis data by matching event type information generated in correspondence to each coordinate in each effective area and count information corresponding to the event type information, and transfers the identified event count information to the heat map generation unit 153.

Meanwhile, the heat map generation unit 153 generates a heat map showing a result of behavior analysis on the dynamic webpage of the user, on the basis of the event count information and the area information corresponding to the effective area.

Then, the dynamic webpage synchronization unit 154 synchronizes and outputs the generated heat map on the current webpage. Here, when the webpage is dynamically changed according to a user input, the dynamic webpage synchronization unit 154 may process to output a heat map that is synchronized and modified in correspondence to detection of a change in the changed effective element.

This will be described in more detail with reference to FIGS. 10 and 11.

FIG. 10 is a flowchart illustrating a method according to an embodiment of the present invention, and first, when an effective element of a dynamic webpage is identified, the behavior information rendering unit 150 identifies an effective area corresponding thereto (S301).

Then, the behavior information rendering unit 150 acquires event counter information corresponding to the effective element (S303), and generates a heat map within the effective area centered on the effective element on the basis of the acquired counter information (S303).

As shown in FIG. 11, it may be confirmed that the effective areas corresponding to each effective element are formed in the form of a rectangular box within a predetermined size centered on the effective element. For example, the effective elements may be one or more displayed webpage objects capable of interaction, such as clicking, scrolling or the like on a dynamic webpage, and the effective area may be set in the form of a predetermined figure within a predetermined range centered on the effective element.

In addition, the heat map may include a distribution chart of a form in which counter information corresponding to an event selected through a manager interface is visualized for each coordinate in correspondence to the effective area. For example, the behavior information rendering unit 150 may calculate the counter density of the effective area according to the counter information, generate a distribution chart image corresponding to the density, and arrange the distribution chart image in the effective area on the heat map. Accordingly, the manager may intuitively confirm the density and the distribution of the counter information of each effective area corresponding to a specific event.

Meanwhile, the behavior information rendering unit 150 provides the generated heat map in synchronization with the reaction of the dynamic webpage according to a manager input (S307).

For example, in FIG. 11, an effective area may be set in correspondence to the effective element of the selectable menu item of Features, and when the Features menu element is selected, a dynamic page operation of outputting a function introduction page in the lower portion may be processed.

Accordingly, the behavior information rendering unit 150 may process heat map update corresponding to the operation of the dynamic page through the dynamic webpage synchronization unit 154, and provide synchronization corresponding to the dynamic webpage by outputting again the updated heat map.

To this end, an element change sensing result sensed by the element change sensing unit 160 described above may be used. The dynamic webpage synchronization unit 154 may sense a change in an effective element on the currently displayed dynamic webpage using the element change sensing result, determine a newly detected or removed effective element according to the sensing, and control to output the dynamic webpage synchronized with the heat map by controlling operation of the effective area identification unit 151, the event count identification unit 152, and the heat map generation unit 153 corresponding to the determined effective element and the effective area.

The method according to the present invention described above may be manufactured as a program to be executed in a computer and stored in a computer-readable recording medium, and examples of the computer-readable recording medium are ROM, RAM, CD-ROM, a magnetic tape, a floppy disk, an optical data storage device and the like.

The computer-readable recording medium may be distributed in computer systems connected through a network, and computer-readable codes may be stored and executed in a distributed manner. In addition, function programs, codes and code segments for implementing the method may be easily inferred by the programmers in the field to which the present invention pertains.

In addition, although preferred embodiments of the present invention are shown and described above, the present invention is not limited to the specific embodiments described above, and various modified embodiments can be made by those skilled in the art without departing from the gist of the present invention claimed in the claims described below, and these modified embodiments should not be individually understood from the spirit and prospect of the present invention.

The invention claimed is:

1. A method of providing dynamic website analysis information, the method comprising:
   receiving visitor behavior analysis data of a dynamic webpage;
   identifying an effective area corresponding to an effective element from the dynamic webpage;
   acquiring event counter information corresponding to the effective area from the visitor behavior analysis data;
   generating a heat map showing a user behavior analysis result on the dynamic webpage based on the event counter information; and
   synchronizing and outputting the generated heat map on the dynamic webpage,
   wherein the dynamic webpage includes one or more functional elements on a reactive dynamic web page capable of generating a dynamic event,
   wherein the one or more functional elements perform a function according to hovering of a pointer corresponding to an effective element on the reactive dynamic web page,
   wherein the visitor behavior analysis data includes event counter information collected in correspondence to hovering events of the pointer for the dynamic webpage,
   wherein the synchronizing and outputting the generated heat map comprises:
      identifying an effective element of the dynamic webpage;
      generating heat map indicating event index based on the event counter information corresponding to the effective element from the visitor behavior analysis data; and
      outputting the generated heat map in synchronization with a user input of the dynamic webpage by overlaying the generated heat map to the dynamic webpage and a user behavior analysis result of the effective elements is provided together with an actual operation of the dynamic webpage as it is.

2. The method according to claim 1, wherein the effective element includes one or more webpage elements on which a function according to a user input is performed on the dynamic webpage.

3. The method according to claim 2, wherein an element, among the effective elements, processed to be hidden or obscured on a surface by overlapping of another layer is excluded from the effective elements according to an operation on the dynamic webpage.

4. The method according to claim 1, wherein the effective area is formed as a figure within a predetermined size centered on the effective element.

5. The method according to claim 1, wherein the heat map includes a distribution chart image in which event counter information is visualized for each coordinate in correspondence to the effective area.

6. The method according to claim 5, wherein the outputting the generated heat map further comprises: calculating a counter density of each effective area according to the event counter information, generating a distribution chart image corresponding to the density, and arranging the distribution chart image in the effective area on the heat map.

7. The method according to claim 1, wherein the synchronizing and outputting the generated heat map further comprises: providing the generated heat map in synchronization with a reaction of the dynamic webpage according to a user input.

8. The method according to claim 7, wherein the providing the generated heat map comprises:
sensing a change in an effective element on a currently displayed dynamic webpage using an element change sensing result; and
determining a newly detected or removed effective element according to the sensing, and controlling to output a dynamic webpage synchronized with the heat map by controlling operation of an effective area identification processor, an event count identification processor, and a heat map generation processor corresponding to the determined effective element and the effective area.

9. A device for providing dynamic website analysis information, the device comprising:
a communication processor receiving visitor behavior analysis data of a dynamic webpage;
an effective area identification processor identifying an effective area corresponding to an effective element from the dynamic webpage;
an event count identification processor acquiring event counter information corresponding to the effective area from the visitor behavior analysis data;
a heat map generation processor generating a heat map showing a user behavior analysis result on the dynamic webpage based on the event counter information; and
a dynamic webpage synchronization processor synchronizing and outputting the generated heat map on the dynamic webpage,
wherein the dynamic webpage includes one or more functional elements on a reactive dynamic web page capable of generating a dynamic event,
wherein the one or more functional elements perform a function according to hovering of a pointer corresponding to an effective element on the reactive dynamic web page,
wherein the visitor behavior analysis data includes event counter information collected in correspondence to hovering events of the pointer for the dynamic webpage,
wherein the dynamic webpage synchronization processor is configured to:
identify an effective element of the dynamic webpage; and
generate heat map indicating event index based on the event counter information corresponding to the effective element from the visitor behavior analysis data; and
output the generated heat map in synchronization with a user input of the dynamic webpage by overlaying the generated heat map to the dynamic webpage and a user behavior analysis result of the effective elements is provided together with an actual operation of the dynamic webpage as it is.

10. The device according to claim 9, wherein the effective element includes one or more webpage elements on which a function according to a user input is performed on the dynamic webpage.

11. The device according to claim 10, wherein an element, among the effective elements, processed to be hidden or obscured on a surface by overlapping of another layer is excluded from the effective elements according to an operation on the dynamic webpage.

12. The device according to claim 9, wherein the effective area is formed as a figure within a predetermined size centered on the effective element.

13. The device according to claim 9, wherein the heat map includes a distribution chart image in which event counter information is visualized for each coordinate in correspondence to the effective area.

14. The device according to claim 13, wherein the heat map generation processor calculates a counter density of each effective area according to the event counter information, generates a distribution chart image corresponding to the density, and arranges the distribution chart image in the effective area on the heat map.

15. The device according to claim 9, wherein the dynamic webpage synchronization processor provides the generated heat map in synchronization with a reaction of the dynamic webpage according to a user input.

16. The device according to claim 15, wherein the dynamic webpage synchronization processor senses a change in an effective element on a currently displayed dynamic webpage using an element change sensing result; and determines a newly detected or removed effective element according to the sensing, and controls to output a dynamic webpage synchronized with the heat map by controlling operation of the effective area identification processor, the event count identification processor, and the heat map generation unit corresponding to the determined effective element and the effective area.

17. A non-transitory recording medium recording a program for executing the method of claim 1 in a computer.

* * * * *